United States Patent [19]

Inaba et al.

[11] 4,164,760
[45] Aug. 14, 1979

[54] STATIONARY-PICTURE TRANSMISSION SYSTEM UTILIZING A DIGITAL MEMORY TECHNIQUE

[75] Inventors: Masao Inaba; Kazumi Yuasa; Michiaki Sonoda, all of Tokyo, Japan

[73] Assignee: Nippon Electric Co., Ltd., Tokyo, Japan

[21] Appl. No.: 856,036

[22] Filed: Nov. 30, 1977

[30] Foreign Application Priority Data

Nov. 30, 1976 [JP] Japan .................................. 51-144205

[51] Int. Cl.² ............................................. H04N 5/22
[52] U.S. Cl. ..................................................... 358/183
[58] Field of Search ........................... 358/183, 93, 160

[56] References Cited

U.S. PATENT DOCUMENTS

| | | | |
|---|---|---|---|
| 3,911,419 | 10/1975 | Bates et al. | 358/183 |
| 3,943,280 | 3/1976 | Kimura et al. | 358/183 |
| 3,984,628 | 10/1976 | Sharp | 358/183 |

Primary Examiner—Richard Murray
Attorney, Agent, or Firm—Hopgood, Calimafde, Kalil, Blaustein & Lieberman

[57] ABSTRACT

A narrowband stationary-picture transmission system including means for transmitting information representing the position in the picture of a pointer displayed on the picture, and the pattern of such a pointer, and means for providing the pointer on the picture at the receiving end in accordance with the information transmitted. Any pointer pattern can be added to the picture already transmitted without the need of retransmitting the picture and pointer information.

6 Claims, 3 Drawing Figures

STATIONARY-PICTURE TRANSMISSION SYSTEM UTILIZING A DIGITAL MEMORY TECHNIQUE

FIELD OF THE INVENTION

This invention relates to television signal transmission systems and more particularly to stationary-picture transmission system which is capable of transmitting a television signal over a narrowband transmission line.

DESCRIPTION OF THE PRIOR ART

In a conventional stationary-picture transmission system such as the one described in an article entitled "Development of Color Freeze-picture Transmission System" published in NEC RESEARCH & DEVELOPMENT, No. 43, October, 1976, pp 1-13, a television video signal of one frame or one field produced by a pick-up tube at a television standard scanning rate is stored in a one-frame or one-field memory. The stored signal is read out at a lower scanning rate in order to transmit the signal over a narrowband transmission line such as a public telephone line to a receiving end. At the receiving end, the received signal is stored in a one-frame or one-field memory at the lower scanning rate and then read out at the television standard scanning rate. Such a conventional system is disadvantageous in that even when it is desired to only display a simple pattern of symbols, such as an arrow or a circle mark (which will be referred to hereinafter as a pointer), on a picture which has already been completely transmitted, it has been necessary to retransmit the complete picture information. Due to the necessity of retransmitting an entirely new picture, including the pointer, the transmission time required therefor has been extended, to approximately ten minutes when using a limited bandwidth digital transmission system having a transmission rate of 2400 bits per second.

It is, therefore, an object of this invention to provide a stationary-picture transmission system in which whenever it is desired to display a pointer, in a limited period of time on a picture which has already been completely transmitted, the pointer information will be transmitted without the need of retransmitting complete picture and pointer information.

SUMMARY OF THE INVENTION

In a stationary-picture transmission system according to the instant invention, at a transmitting end, arrangement is made so that a pointer may be displayed at any desired position on the screen of a television monitor. It is a feature of the invention that due to the fact that the addresses on memories at the transmitting and receiving ends correspond to each other, only the information representing the type of pointer displayed at the transmitting end, and the information of the memory address corresponding to the position of the pointer in the picture, are transmitted to the receiving end. It is a another feature of the invention that, when it is desired to delete a pointer previously added, only the information for such deletion is transmitted.

It is a further feature of the invention that, at the receiving end, a pointer of the same type as that displayed at the transmitting end can be displayed on the television monitor in the same position as at the transmitting end in a limited period of time in accordance with the information sent from the transmitting end which specifies the type and position of the pointer.

The foregoing and other objects and features of this invention will be more fully understood from the following description of an illustrative embodiment thereof taken in conjunction with the accompanying drawings.

DETAILED DESCRIPTION

Figure 1:
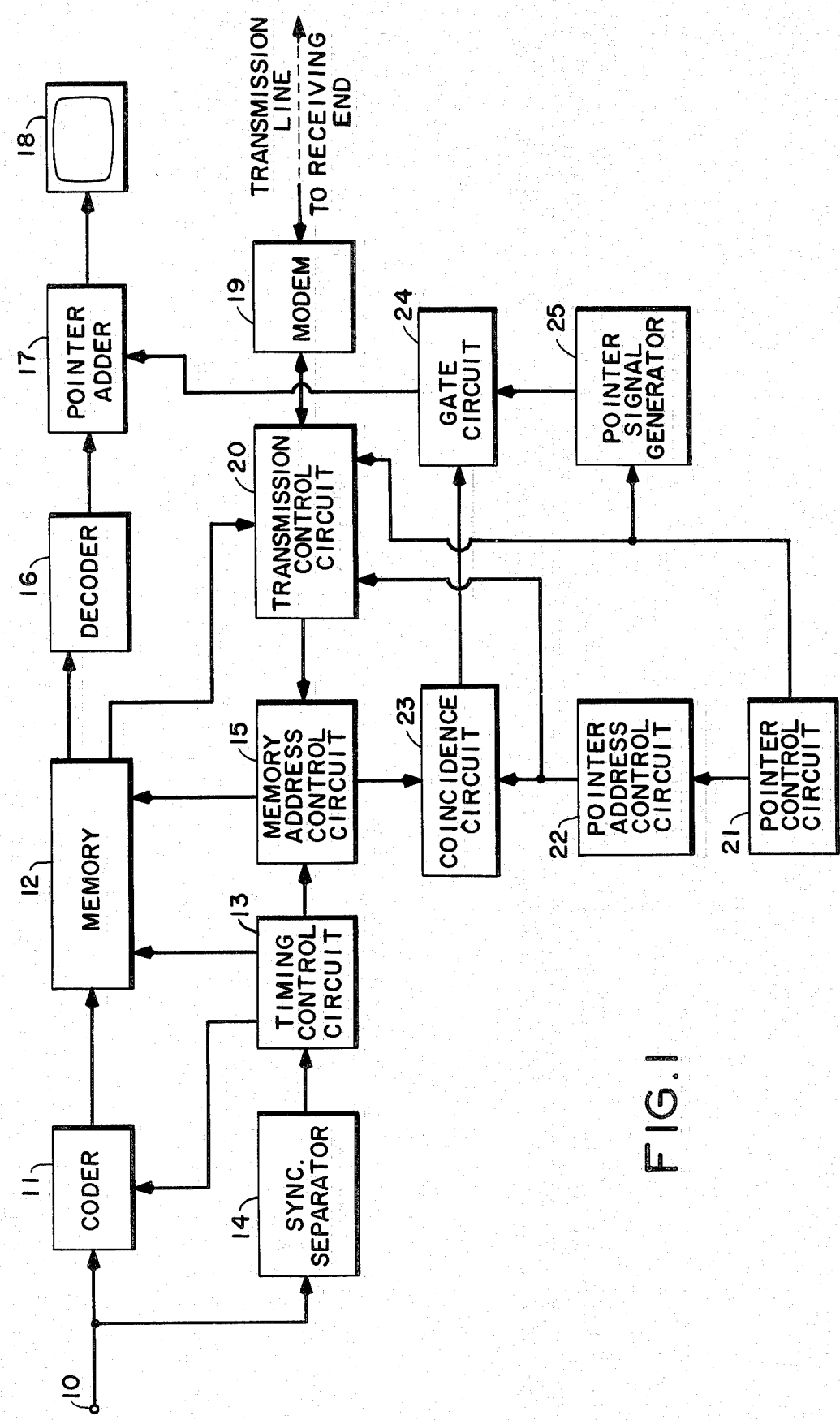
FIGS. 1 and 2 are block diagrams of transmitting and receiving ends, respectively, of a first preferred embodiment of the present invention.

Referring to FIG. 1, the video signal from a terminal 10 is converted at a coder 11 from analog to digital form and the digitized video information for one frame is written in a memory 12. The coder 11 is fed with clock pulses which are generated by timing control circuit 13 in response to the horizontal and vertical synchronizing signals, extracted from the video signal, by a sync separator 14. The timing control circuit 13 also generates timing pulses required for writing in, and reading out of the memory 12. A memory address control circuit 15 is provided to generate address data needed for the memory 12. Control circuit 15 utilizes the clock pulses from the timing control circuit 13.

The video information stored in the memory 12 is repeatedly read out at a television standard scanning rate in accordance with a first read-out address produced by the memory address control circuit 15. The read out digital video signal is converted to an analog video signal by a decoder 16. The analog video signal is supplied through a pointer adder 17, to a television monitor 18, whereby the picture stored in the memory 12, which is to be transmitted, can be displayed on the television monitor 18.

The video information stored in the memory 12 is also read out at a rate less than the standard television scanning rate in accordance with a second read-out address produced by the memory address control circuit 15. The second read-out address is produced in accordance with a timing pulse supplied from a modulator-demodulator (MODEM) 19 through a transmission control circuit 20. The read-out video information of narrow bandwidth is parallel-to-serial converted at the transmission control circuit 20, and then transmitted at the lower rate through the MODEM 19 and over a narrowband transmission line to a receiving end.

After the entire video information stored in the memory 12 has been transmitted to the receiving end it is often desirable to display a pointer on the transmitted picture. When it is desired to display a pointer, data representing the type and the position of the pointer to be displayed are produced by a pointer control circuit 21. The position data for the pointer is supplied to a pointer address control circuit 22, which may be a counter as in the case of the address control circuit 15. The pointer-address control circuit 22 produced a pointer address in accordance with the pointer-position data supplied by pointer control circuit 21. The pointer address data can be controlled, for example, by varying the contents of the counter, included in circuit 22, in accordance with the pointer-position data from the pointer control circuit 21. The pointer-address data is supplied to a coincidence circuit 23, which is also supplied with the first read out address at the television standard scanning rate. When two address coincide with each other, the coincidence circuit 23 produces a gate signal, which is then supplied to a gate circuit 24.

The pointer data representing the type of the pointer to be displayed is supplied, from the pointer control circuit 21, to a pointer signal generator 25, which may consist of a read only memory (ROM) for storing different types or patterns of pointers such as an arrow, a circle mark, a triangle mark and so on. A desired pointer signal is produced in accordance with the pointer data from the pointer control circuit 21 and then supplied to the gate circuit 24. The gate circuit 24, under the control of the gate signal from the coincidence circuit 23, applies the pointer signal to the pointer adder 17, in which the pointer signal is superimposed on the decoded analog video signal from the decoder 16, whereby the picture including the pointer therein can be displayed on the television monitor 18. It is then possible to select the pointer by monitoring the picture displayed on the television monitor 18. The pointer signal may be produced either at the level of white or black, depending upon the contents of the picture.

The transmission control circuit 20 is supplied with the pointer data and the pointer position data from the pointer control circuit 21 and the pointer address control circuit 22, respectively. This data is parallel-to-serial converted and then transmitted through the MODEM 19 and the transmission line to the receiving end.

As will be detailed hereinafter it is not necessary to send all the information on the pattern of the pointer as pointer position information and it suffices to send only the information representing the leading address of the pointer position as long as the pattern of the pointer is fixed in advance at both the transmitting and receiving ends.

Figure 2:
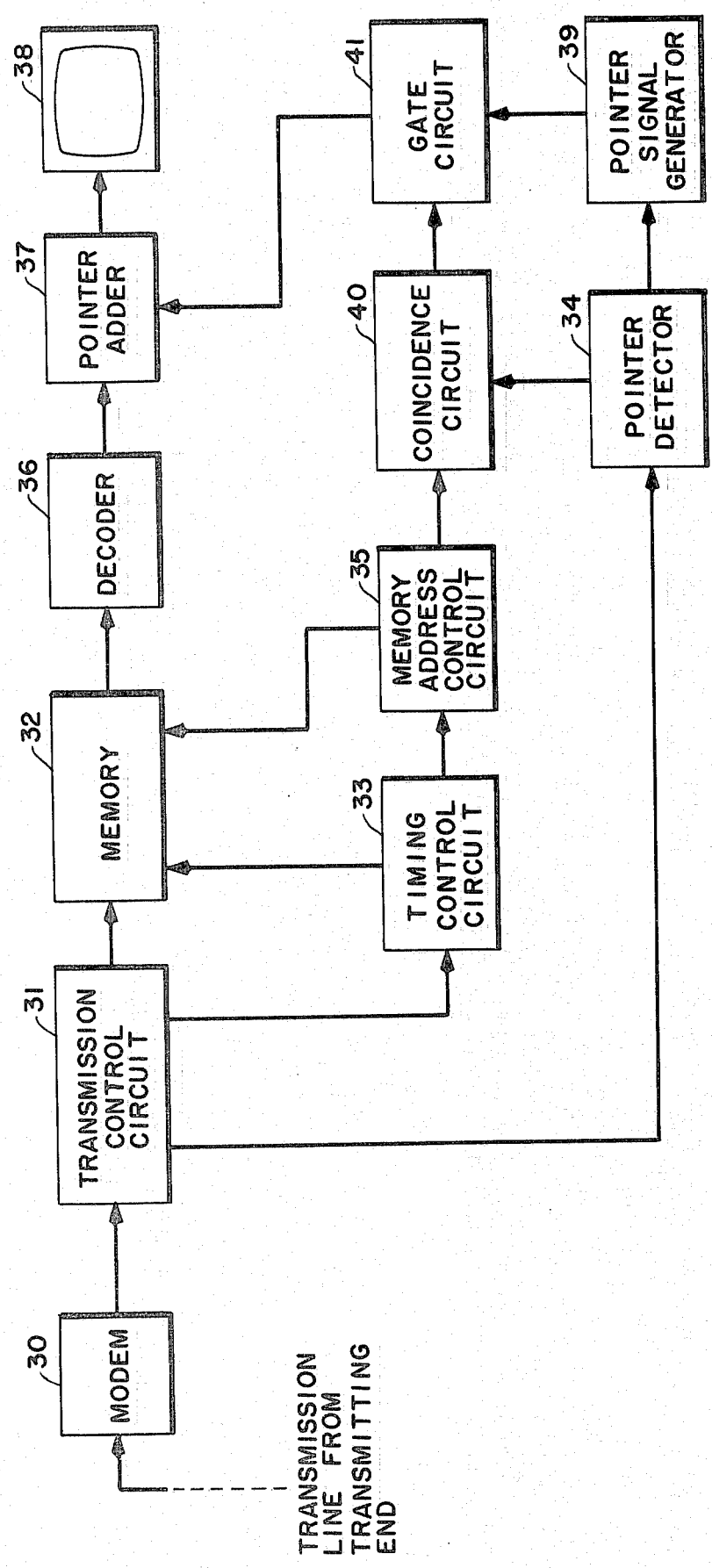

Description will next be made of the operation at the receiving end thereof with reference to FIG. 2.

The information coming from the transmitting end over the transmission line is received by a MODEM 30 and serial-to-parallel converted in a transmission control circuit 31. The information thus converted is monitored and, if found to indicate the beginning or end of data, the data is fed to a timing control circuit 33. On the other hand, if the data is found to be video information it is fed to a memory 32. If the data is to be pointer information, the information is fed to a pointer detector 34.

The timing control circuit 33 is also fed with clock pulses from the MODEM 30 via the transmission control circuit 31. The clock pulses are used for writing the video information in the memory 32 and, at the same time, are employed as clock pulses for a memory address control circuit 35.

In memory 32, the video information is written in, at a rate less than the standard television scanning rate, for a one-frame or one-field of the picture, in accordance with the write-in timing pulses from the timing control circuit 33 and the address data given by the memory address control circuit 35. The timing control circuit 33 also produces clock pulses and read out address data for reading out the stored video information at the rate of a television scan (60 fields per second). The video information read out at the rate of a television scan is converted from a digital signal to an analog signal form by a decoder 36 identical to the decoder 15 (FIG. 1). The decoded analog video signal is directed through a pointer adder 37 to be reproduced on a television monitor 38.

The pointer data and the pointer position data are detected in the transmission control circuit 31 and separated from each other at the pointer detector 34. The pointer data is directed to a pointer signal generator 39 while the pointer position data is directed to a coincidence circuit 40. The pointer signal generator 39, identical to the pointer signal generator 25 (FIG. 1), produces, in accordance with the pointer data, the pointer signal corresponding to the type of pointer displayed on the television monitor 18 (FIG. 1). The pointer signal is then fed to a gate circuit 41. The coincidence circuit 40 compares the pointer address data from the pointer detector 34 with the read out address data from the memory address control circuit 35 to produce a gate signal when the two addresses coincide with each other. Under the control of the gate signal, the gate circuit 41 applies the pointer signal from the pointer signal generator 39 to the pointer adder 37. In the pointer adder 37, the pointer signal is superimposed on the analog video signal regenerated at the decoder 36 and the resulting signal is directed to a television monitor 38. Thus, the picture including the pointer therein can be displayed on the television monitor 38 at the receiving end in a limited period of time by transmitting only the pointer data and the pointer address data.

Further, the pointer address control circuit 22 (FIG. 1) and the pointer detector 34 (FIG. 2) may be formed so that a plurality of pointers are displayed simultaneously on the same picture.

Another preferred embodiment of the present invention will next be described with reference to FIG. 3, which is a block diagram showing the structure of the system at the receiving end. The structure of the embodiment at the transmitting end is similar to that of the first embodiment shown in FIG. 1 and any further explanation thereof is believed to be unnecessary.

Figure 3:
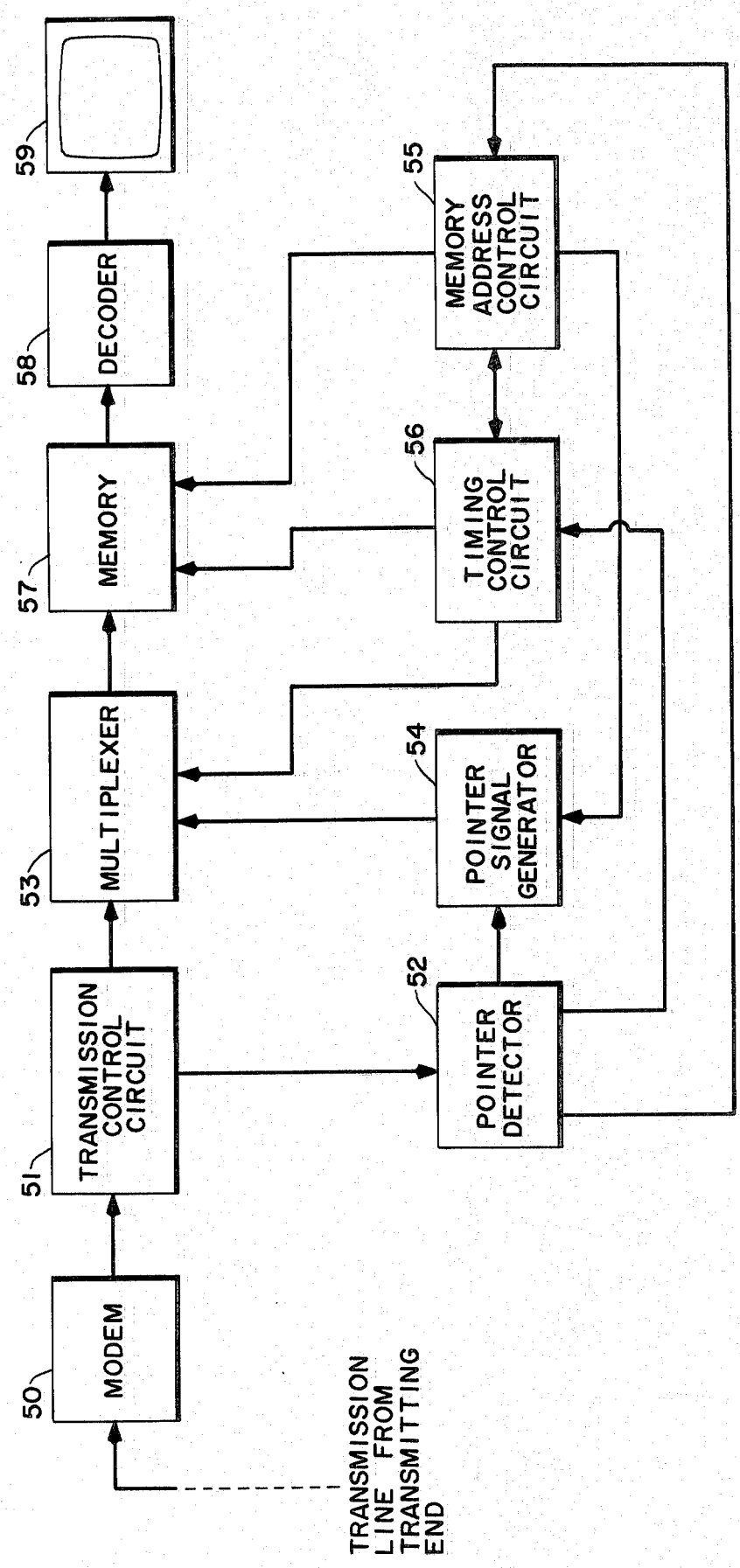
FIG. 3 is a block diagram of the receiving end of a second preferred embodiment of the invention.

Referring to FIG. 3, the pointer data and pointer address data from the transmitting end are fed through a MODEM 50 to a transmission control circuit 51 in which the data is converted from serial to parallel form and monitored at the output by pointer detector 52. The video information from the transmitting end is directed through the transmission control circuit 51 to a multiplexer 53. The pointer detector 52 selects the pointer data, the pointer address data, and delete information to supply to pointer signal generator 54, memory address control circuit 55 and timing control circuit 56, respectively. The pointer signal generator 54 produces the pointer signal as specified by the pointer data from the pointer detector 52. The pointer signal is produced at a predetermined time in accordance with the address given by the memory-address control circuit 55 and the generator circuit output is fed to the multiplexer 53. The timing control circuit 56 generates timing pulses required for memory writing and reading while feeding the multiplexer 53 with a switching signal for data to be written into memory 57. The memory address control circuit 55 feeds the memory 57 with an address in accordance with the clock pulses given by the timing control circuit 56 and stores the pointer-position data for comparison with the address being fed to the memory 57. When the position data and the memory address are found coincident with each other, the memory-address control circuit 55 outputs a coincidence signal to the timing control circuit 56. Upon reception of the coincidence signal, the timing control circuit 56 sends the switching signal to the multiplexer 53, while at the same time, giving a write instruction to the memory 57. In this manner, a pointer of the same kind as that of the pointer added at the transmitting end is written in the memory 57 at the same address. The pointer thus written in the memory 57 is repeatedly read out thereof, together with the video information previously transmitted thereto, at the rate of a television scan (60 fields per second) and converted back into analog form at a decoder 58 to be outputed to a television monitor 59. In addition, the multiplexer 53 serves the purpose of switching the selection of data to be written in the memory 57 between the video information from the transmission control circuit 51 and the pointer from the pointer signal generator 54 in accordance with the switching signal from the timing control circuit 56.

Although a specific embodiment of this invention has been shown and described, it will be understood that various modifications may be made without departing from the spirit of this invention.

What is claimed is:

1. A stationary-picture transmission system for transmitting a stationary picture signal from a transmitter through a narrowband transmission line to a receiver positioned at a distance from said transmitter, said transmission system including, means for producing a digitized video signal representing said stationary picture;

first memory means for storing at least one field of said digitized video signal, first read-out means for reading out the stored digitized video signal at a first scanning rate to produce a first read-out digitized video signal, said first read-out means including means for producing first read-out address data representing addresses of said first memory means from which said stored digitized video signal is read out, means for transmitting said first read-out digitized video signal through said narrowband transmission line;

means for receiving the digitized video signal transmitted over said transmission line, second memory means for storing the received digitized video signal at said first scanning rate, second read-out means for reading out the stored digitized video signal from said second memory means at a second scanning rate to produce a second read-out digitized video signal, said second read-out means including means for producing second read-out address data representing addresses of said second memory means from which said stored digitized video signal is read out, means for decoding said second read-out digitized video signal to an analogue stationary-picture signal, and means responsive to said analogue stationary-picture signal for displaying said stationary picture transmitted over said transmission line characterized in that said transmission system further includes, pointer producing means for producing pointer data representing a pointer to be displayed on said stationary picture and pointer-position data representing the position of said pointer on said stationary picture, said pointer data and said pointer-position data being transmitted by said transmitting means through said narrowband transmission line after the completion of the transmission of said stationary picture, means for detecting the presence of said pointer data and said pointer-position data on said transmission line, means responsive to said pointer data for producing a first pointer video signal representing said pointer to be displayed on said stationary picture; and means responsive to said pointer-position data and said second read-out address data for adding said first pointer video signal to said analogue stationary-picture signal.

2. A stationary-picture transmission system for transmitting a stationary picture signal from a transmitter through a narrowband transmission line to a receiver positioned at a distance from said transmitter, said transmission system including, means for producing a digitized video signal representing said stationary picture, first memory means for storing at least one field of said digitized video signal, first read-out means for reading out the stored digitized video signal at a first scanning rate to produce a first read-out digitized video signal, said first read-out means including means for producing first read-out data representing addresses of said first memory means from which said stored digitized video signal is read out, means for transmitting said first read-out digitized video signal through said narrowband transmission line, means for receiving the digitized video signal transmitted over said transmission line, second memory means for storing the received digitized video signal at said first scanning rate, second read-out means for reading out the stored digitized video signal from said second memory means at a second scanning rate to produce a second read-out digitized video signal, said second reading out means including means for producing second read-out address data representing addresses of said second memory means from which said stored digitized video signal is read out, means for decoding said second read-out digitized video signal to an analogue stationary-picture signal, and means responsive to said analogue stationary-picture signal for displaying said stationary picture transmitted over said transmission line, characterized in that said transmission system further includes, pointer producing means for producing pointer data representing a pointer to be displayed on said stationary picture and pointer-position data representing the position of said pointer on said stationary picture, said pointer data and said pointer-position data being transmitted by said transmitting means through said narrowband transmission line after the completion of the transmission of said stationary picture, means for detecting the presence of said pointer data and said pointer-position data on said transmission line, means responsive to said pointer data for producing a pointer signal as specified by said pointer data; and means responsive to said pointer-position data and said second read-out address data for writing said pointer signal in said second memory means.

3. A stationary-picture transmission system as claimed in claim 1 or 2, wherein said transmitter further includes, third read-out means for reading out the stored digitized video signal from said first memory means at said second scanning rate to produce a third read-out digitized video signal, said third read-out means including means for producing third read-out address data, means for decoding said third read-out digitized video signal to an analogue video signal,
  means responsive to said analogue video signal for displaying said stationary picture,
  means responsive to said pointer data for producing a second pointer video signal; and
  means responsive to said pointer-position data and said third read-out address data for adding said second pointer video signal to said analogue video signal.

4. A stationary-picture transmission system as claimed in claim 1 or 2, wherein said second scanning rate is a standard television scanning rate of 60 fields per second and said first scanning rate is less than said second scanning rate.

5. A stationary-picture transmission system as claimed in claim 1 or 2, wherein said pointer producing means further includes means for producing a plurality of pointer data representative of different types of pointers to be displayed on said stationary picture.

6. A stationary-picture transmission system as claimed in claim 5, wherein said pointer signal producing means includes read-only-memory means.

* * * * *